United States Patent [19]

Jain et al.

[11] Patent Number: 4,861,361

[45] Date of Patent: Aug. 29, 1989

[54] ARGON AND NITROGEN COPRODUCTION PROCESS

[75] Inventors: Ravi Jain, Piscataway; Alberto LaCava, South Plainfield; Mark J. Andrecovich, Somerville; Donald L. MacLean, Annandale, all of N.J.

[73] Assignee: The BOC Group, Inc., New Providence, N.J.

[21] Appl. No.: 249,793

[22] Filed: Sep. 27, 1988

[51] Int. Cl.⁴ ................................................. F25J 3/00
[52] U.S. Cl. ............................................. 62/18; 55/66; 62/22; 62/24; 62/40
[58] Field of Search ................... 62/18, 22, 23, 24, 40; 55/66

[56] References Cited

U.S. PATENT DOCUMENTS

| | | | |
|---|---|---|---|
| 2,968,160 | 1/1961 | Schilling et al. | 62/18 |
| 3,412,567 | 11/1968 | Smith | 62/18 |
| 3,866,428 | 2/1975 | Simonet et al. | 62/18 |
| 3,967,464 | 7/1976 | Cormier et al. | 62/18 |
| 4,687,498 | 8/1987 | MacLean et al. | 55/66 |
| 4,689,062 | 8/1987 | MacLean et al. | 55/66 |

Primary Examiner—Ronald C. Capossela
Attorney, Agent, or Firm—Carol A. Nemetz; R. Hain Swope; L. R. Cassett

[57] ABSTRACT

Argon and nitrogen are separated from a gaseous stream containing them in combination with oxygen in a three-step process comprising introducing the gaseous stream under pressure to a noncryogenic separator to produce therein a stream encircled in nitrogen and argon, introducing said stream into a cryogenic distillation column to produce a high purity nitrogen product. An argon-rich side stream withdrawn from the cryogenic distillation column is introduced into a pressure swing adsorption unit to provide a crude argon product containing 97 percent or more of argon. The first noncryogenic separator may be a pressure swing adsorption unit or a gas diffusion zone.

12 Claims, 2 Drawing Sheets

4,861,361

ARGON AND NITROGEN COPRODUCTION PROCESS

The present invention is directed to a process for the production of argon and nitrogen from a gaseous stream containing them in combination with oxygen, e.g. air.

BACKGROUND OF THE INVENTION

Argon and nitrogen are used in a number of industrial applications, including electronics manufacture and metals fabrication. These gases are conventionally produced using cryogenic air separation methods. The cryogenic separation of air to produce argon and nitrogen is described by H. Springmann in IOMA Broadcaster, pp. 14-18 (Jan-Feb 1983). The process produces a significant amount of oxygen in addition to nitrogen and argon, but is not very efficient when utilized to produce only argon and nitrogen. Since the demand for argon and nitrogen is growing at a rapid rate compared to oxygen, there is considerable interest in efforts to increase the efficiency of the production of argon and nitrogen from air.

U.S. Pat. No. 4,732,580, for example, discloses a two-step process for producing argon and nitrogen from air without concomitant production of oxygen using a combination of low temperature pressure swing adsorption ("PSA") and cryogenic distillation. The PSA step produces a stream containing $N_2$, Ar and a small amount, typically under 0.1%, of $O_2$ which is subsequently separated cryogenically to produce high purity nitrogen and crude argon. Although this process produces argon and nitrogen from air, it has a number of disadvantages, notable among which is the high capital cost of the high-purity PSA step. In addition, the sieve specific product is low.

The present invention provides an improved process for argon and nitrogen coproduction that is characterized by an increased yield of both argon and nitrogen with a lower capital cost and lower energy requirements in comparison to known processes.

BRIEF SUMMARY OF THE INVENTION

A compressed feed containing oxygen, nitrogen and argon is initially separated in a noncryogenic separator to provide a product stream enriched in nitrogen and argon which contains from about 1-10% of oxygen. The initial separation may be carried out in a pressure swing adsorption (PSA) unit or a gas diffusion zone, e.g. a membrane separation unit. Most of the oxygen and other impurities in the compressed feed are removed in the first separation step. The effluent from the first separation step is cooled to close to its dew point and introduced into a cryogenic distillation column to form an overhead nitrogen fraction which is taken as product, and a bottom fraction containing most of the oxygen in the first step effluent. A side stream withdrawn from a zone of the cryogenic distillation column having a high argon concentration is separated in a PSA unit into a crude argon product containing small amounts of oxygen and nitrogen and a waste stream which is returned to the cryogenic distillation column. The refrigeration for the cryogenic distillation column is provided by a heat-pump circuit preferably using pure nitrogen as the heat pump fluid.

DESCRIPTION OF THE PREFERRED EMBODIMENTS

Figure 1:
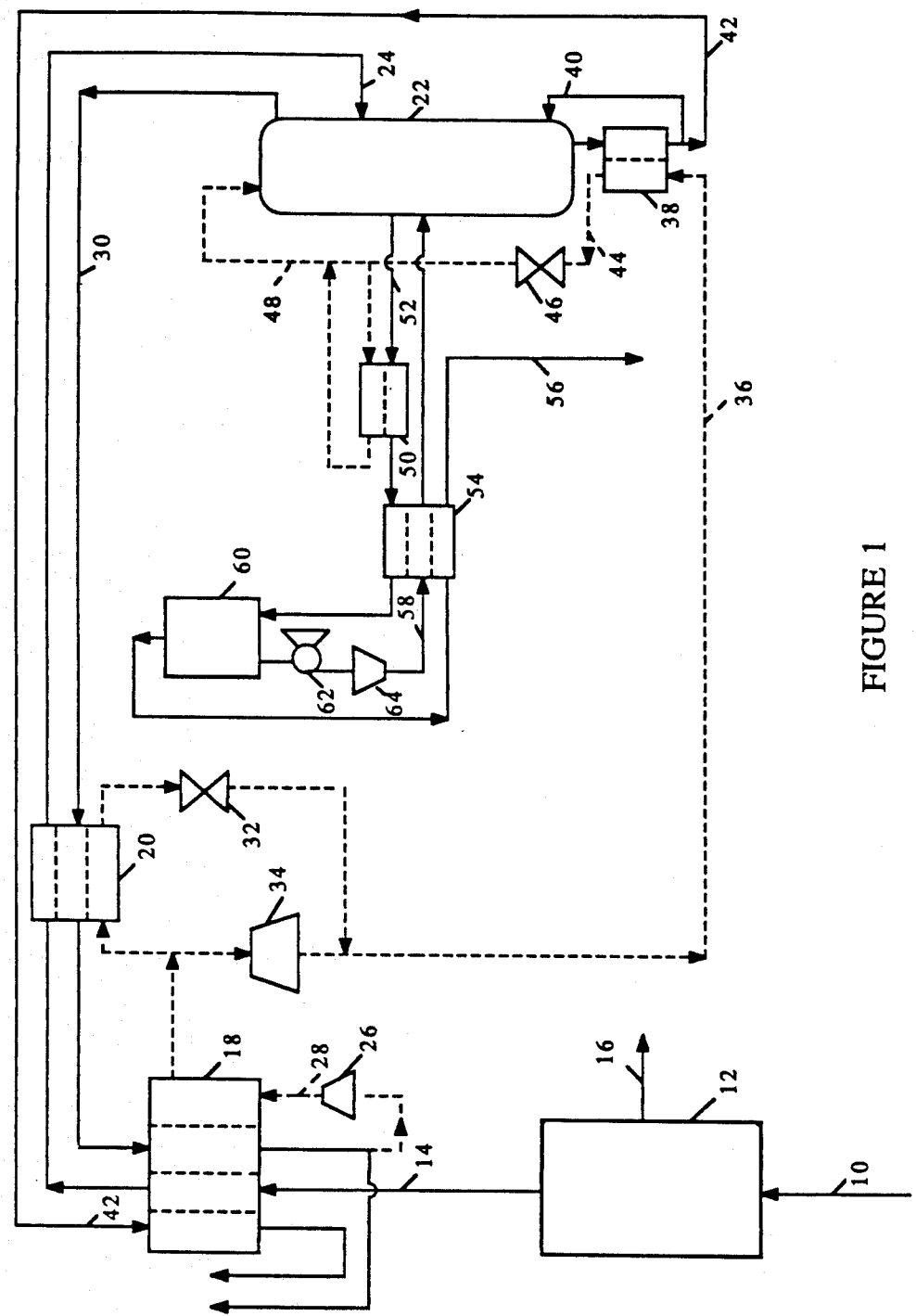
FIG. 1 is a schematic diagram of the process for argon and nitrogen coproduction according to the present invention utilizing pure nitrogen as the heat pump fluid.

Referring to FIG. 1, a feed gas mixture, preferably air, is introduced under pressure through conduit 10 into a noncryogenic separating means 12. Separating means 12 can be a pressure swing adsorption (PSA) unit or a gas diffusion zone, e.g. a membrane separation unit, preferably the former, as will be described hereinafter. The pressure of the feed gas mixture will, in most instances, be between about 30 and 200 psig for either a PSA unit or a gas diffusion zone. Optimum pressure in each instance will vary depending on specific operating parameters of the unit utilized. The compressed feed stream is preferably treated after compression and prior to introduction into the first separation means to reduce its temperature to about ambient and also to remove water therefrom in conventional treatment means not shown, e.g. an aftercooler. In the first separation means 12, most of the oxygen and substantially all of the water and carbon dioxide in the feed gas are removed. There is produced a Product stream 14 enriched in nitrogen and argon and an oxygen-enriched waste stream 16 comprising oxygen, carbon dioxide and water. The nitrogen/argon product stream 14 generally contains from about 1 to 10 percent of oxygen.

In a first embodiment of the subject invention, the first separator 12 is a gaseous diffusion zone or vessel which contains a suitable gaseous diffusion barrier, i.e. a membrane. Such units are commercially available, for example, from UOP Fluid Systems containing a silicon rubber membrane, from Monsanto Chemical Company containing a polysulfone membrane and from Dow Chemical Company containing a polymethylpentene membrane. In addition to polymeric membranes, membranes containing oxygen carriers, such as described by Drago et al, Inorganic Chem., Vol. 25, pp. 716-718/1986 and Nishide et al, Macromolecules, Vol. 19, pp. 494-496 (1986) are also suitable in the subject process. There is formed in the gaseous diffusion zone a nonpermeate stream which will be at elevated pressure, i.e. close to the feed pressure, and a permeate stream which will be at reduced pressure, i.e. close to ambient or under vacuum, if desired. The permeabilities of the individual gases in the gas diffusion zone will determine which of the permeate and nonpermeate streams is product and which is waste. In the context of this invention, in the event the permeate stream is the waste oxygen stream 16, it may simply be vented. In the event the permeate stream is the product stream 14, the pressure thereof may have to be increased by suitable means, e.g. a compressor, (not shown) for further processing as described below. Preferably, product stream 14 is the nonpermeate stream formed in the gaseous diffusion zone 12 since the pressure thereof does not have to be increased.

For all commercially available membranes, stream 14 will be the nonpermeate stream. Utilizing a membrane unit having an effective oxygen/nitrogen separation factor of 6.0, operating at a feed pressure of 100 psig and a permeate pressure of one atmosphere, typical nitrogen and argon, yields are 60 and 40 percent, respectively, when the nitrogen product stream 14 contains about 5 percent of oxygen. For this embodiment, residual carbon dioxide and water in the nitrogen product from the membrane unit need to be reduced to below about 1 ppm of each before stream 14 can be processed in the low temperature section described below. This can be carried out in a PSA or temperature swing adsorption unit (not shown) as is conventional in the art.

In a preferred embodiment of the subject invention, the first separator 12 is a pressure swing adsorption (PSA) unit. The PSA unit contains two or more adsorbent beds each of which preferably contains two or more layers of adsorbent. The PSA unit 12 removes carbon dioxide, water and most of the oxygen from the feed stream 10 and the adsorbent layers are chosen accordingly. Activated alumina or silica gel is preferred for the bottom layer in the PSA unit 12 to remove water. In a preferred embodiment, the PSA unit 12 contains an intermediate zeolite layer, typically a commercially available zeolite such as 5A or 13X, for the removal of carbon dioxide from the feed stream 10. The top layer in the PSA unit 12 contains an adsorbent that has a greater selectivity for both argon and nitrogen than oxygen. Suitable adsorbents of this type include certain zeolites, such as 4A, and carbon molecular sieves ("CMS") such as those manufactured by Kuraray Chemical Co., Japan and Bergbau-Forschung, West Germany, with the former being preferred. If the CMS layer has the capacity to separate carbon dioxide as well as oxygen from nitrogen and argon, the intermediate zeolite layer is not necessary. The removal of carbon dioxide, water and oxygen in a single unit is possible because the PSA separation is performed at temperatures close to ambient.

The PSA unit 12 typically operates at feed pressures between about 30–200 psig and at full cycle times between 1 and 8 minutes. The feed pressure will depend on the cycle utilized. If vacuum regeneration is utilized, as is discussed later, the feed pressure ill typically be between about 30–60 psig. However, if the PSA unit 12 operates on a pressure to atmosphere cycle, the feed stream 10 will normally be between about 60–200 psig.

The regeneration of the PSA unit 12 depends on the cycle used. For a pressure to atmosphere cycle, the bed having completed production is first vented to atmosphere and then purged with product from a product reservoir (not shown). In this instance, the waste stream 16 is vented directly to the atmosphere. For a pressure to vacuum cycle, the bed having completed production is initially vented to the atmosphere. The pressure of the bed is then further reduced to between 100 and 500 mbar using a vacuum pump (not shown). The resulting waste stream is also vented to the atmosphere. The two streams are represented in FIG. 1 as stream 16.

A typical operating cycle for a two-bed PSA unit functioning as separator 12 in the system illustrated in FIG. 1 is shown in Table I. The half cycles for each bed are separated by a dotted line. The cycle shown in Table I is a four-minute cycle and represents a pressure to atmosphere mode. A pressure to vacuum mode would be similar with the exception that the purge from product receiver step would be replaced with an evacuation with vacuum pump step of nearly equal duration.

TABLE I

| Step | Bed A | Bed B | Typical Time (sec) |
| --- | --- | --- | --- |
| a | Pressurize | Vent to atmosphere | 10 |
| b | Produce nitrogen product | Vent to atmosphere | 16 |
| c | Produce nitrogen product | Purge from the product receiver | 90 |
| d | Pressure equalize with bed B | Pressure equalize with bed A | 4 |
| e | Vent to atmosphere | Pressurize | 10 |
| f | Vent to atmosphere | Produce nitrogen product | 16 |
| g | Purge from the product receiver | Produce nitrogen product | 90 |
| h | Pressure equalize with bed B | Pressure equalize with bed A | 4 |

Wherein the separator 12 is a gaseous diffusion zone operating at a feed pressure of ten atmospheres and a permeate pressure of one atmosphere, containing a commercially available polymeric membrane such as a polysulfone membrane having typical normalized oxygen, argon and nitrogen permeabilities of 7, 2.5 and 1.0, respectively, the percentage of nitrogen and argon recovered from the feed stream were determined as a function of the oxygen content of the product stream 14 and are given in Table II.

TABLE II

| Percent Oxygen in Stream 14 | Percent Recovered | |
| --- | --- | --- |
| | Nitrogen | Argon |
| 5 | 66.3 | 39.5 |
| 7 | 73.0 | 49.0 |
| 9 | 78.5 | 57.6 |

A membrane containing oxygen carriers having oxygen, nitrogen and argon permeabilities of 20, 2.5 and 1, respectively, and operating under similar conditions, an oxygen content of 5 percent in line 14 will produce nitrogen and argon yields of 84% and 66.6%, respectively.

Wherein the separator 12 is a PSA unit containing Kuraray CMS for oxygen removal operating at an adsorption temperature of 20° C., an adsorption pressure of 35 psig, a regeneration pressure of 200 mbar and a full cycle time of 4 minutes, 65–70% nitrogen yield and 80–85% argon yield can be expected if the product stream 14 contains about 3% oxygen.

The product stream 14 exiting the separator 12 is subsequently cooled to close to its saturation temperature in a first heat exchanger 18 and a second heat exchanger 20 against returning nitrogen and oxygen product streams, to be later described, and enters a cryogenic distillation column 22 as stream 24. The cooled stream 24 is separated in the cryogenic distillation column 22 to produce a high purity nitrogen product, an oxygen product containing about 99% oxygen and an argon-rich side stream as will be described.

The refrigeration for the distillation column 22 may be provided by a heat-pump circuit as is shown by dotted lines in FIG. 1. In the preferred embodiment of the present invention shown in FIG. 1, the fluid in the heat-pump circuit is pure nitrogen. The nitrogen heat-pump fluid is withdrawn from the nitrogen product stream 30 leaving the heat exchanger 18, compressed in compressor 26 and reintroduced into heat exchanger 18 as stream 28 where it is cooled against the cold oxygen Product stream 42 and the cold nitrogen product stream 30. The cold, high-pressure, heat-pump fluid stream exiting heat exchanger 18 is divided into two parts. The first part of this stream, typically 5-20% of the total stream, enters the second heat exchanger 20 where it is condensed against cold nitrogen product stream 30. The condensed heat-pump fluid stream leaving exchanger 20 is expanded across a Joule-Thompson (J-T) valve 32 to further reduce its temperature. The other portion of the heatpump fluid stream 28 exiting heat exchanger 18 is expanded in a turboexpander 34 to approximately the same pressure as the effluent stream from the J-T valve 32. The effluents from the turboexpander 34 and the J-T valve 32 are combined as stream 36 and introduced into a reboiler 38 at the bottom of the distillation column 22.

In reboiler 38, a portion of the distillation column bottoms is reboiled and sent back to the column 22 as stream 40. The remaining portion of the distillation column bottoms, stream 42 is taken off as oxygen product. The pressure and temperature of heat-pump fluid stream 36 entering reboiler 38 are such that it will condense against the reboiled vapors while maintaining an adequate temperature difference at the ends of reboiler 38. The heat-pump fluid stream leaving the reboiler 38 as stream 44 is expanded across a J-T valve 46 to further reduce the temperature thereof. A small portion of the effluent stream 48 from J-T valve 46 is withdrawn, passed through heat exchanger 50 to provide refrigeration therein and returned. The resulting vapor-liquid mixture is introduced directly into the top of distillation column 22 to Provide reflux therefor. The exit pressure of the J-T valve 46 is selected so as to be close to the top tray pressure in the distillation column 22. The pressure of stream 36 is determined and utilized to calculate an overall column heat balance that takes column heat in-leak into account which, in turn, is utilized to determine the amount of liquid in stream 36. For distillation column 22 operating at a pressure of 45 psia, the pressure for stream 36 will typically be about 145 psia.

The pressure of the heat-pump fluid stream 28 leaving the heat-pump fluid compressor 26 is determined by first assuming a pressure therefor. Heat balances are then made across the first heat exchanger 18 and the second heat exchanger 20 to determine enthalpies of the effluent streams of turboexpander 34 and J-T valve 32. The pressure of stream 28 is then varied until the sum of the enthalpies of the effluent streams of turboexpander 34 and J-T valve 32 equals the enthalpy of stream 36.

As mentioned, the distillation column 22 produces a high purity nitrogen product stream 30 and an oxygen Product stream 42. The nitrogen product stream 30 typically contains less than 5 ppm oxygen, the remainder being nitrogen and argon. The oxygen product stream 42 is typically 99% oxygen and contains less than 1 ppm nitrogen, with the balance being argon. In order to produce argon, a side stream 52 is withdrawn from the distillation column 22 at a point where the argon concentration is close to its maximum in the column. Side stream 52, which may contain 55-60% argon and less than 1% nitrogen, is sent to a third heat exchanger 50 where it is cooled against a portion of heat-pump fluid stream 48 leaving the second J-T valve 46. After being cooled in exchanger 50, the side stream 52 from the distillation column 22 enters a fourth heat exchanger 54 where it is warmed up to about ambient temperature thereby cooling an argon product stream 56 and an oxygen-rich waste stream 58 from a PSA unit 60. The warmed distillation column side stream enters the PSA unit 60 where it is separated into a crude argon product stream 56 which contains 95-97% argon and an oxygen enriched waste stream 58.

The PSA unit 60 contains one or more adsorbent beds for oxygen and argon separation. Some of the zeolites such as 4A, clinoptilolite and phillipsite, as well as carbon molecular sieves available from various manufacturers, are suitable adsorbents for this step. Again, carbon molecular sieve manufactured by Kuraray Chemical Co. is the preferred adsorbent. The PSA unit 60 can be operated on a pressure to atmosphere or pressure to vacuum cycle. For a PSA unit 60 containing Kuraray CMS and operating between feed pressure of 43 psia and desorption pressure of 200 mbar, an argon yield of greater than 60% can be expected if the product stream 56 contains 2-3% oxygen and the side stream 52 contains about 60% argon. The waste stream from the PSA unit 60 is withdrawn using a vacuum pump 62 for a pressure to vacuum cycle or withdrawn directly for a pressure to atmosphere cycle and is then compressed and cooled, using cooling water, in compressor 64 to produce stream 58. The pressure of stream 58 is close to the pressure of side stream 52. Both the argon product stream 56 and the waste stream 58 are cooled in the fourth heat exchanger 54 against the cold distillation column side stream 52. The argon product withdrawn from the fourth exchanger 54 as stream 56 may be sent for further processing to a conventional deoxo unit and pure argon column, to storage or to user equipment (not shown). The oxygen-rich waste stream 58 withdrawn from the exchanger 54 is returned to the distillation column 22 on a tray with a similar liquid phase composition as stream 58.

The nitrogen product stream 30 is progressively warmed in the second heat exchanger 20 and the first heat exchanger 18 to recover refrigeration therefrom. The oxygen and nitrogen product streams exiting the first heat exchanger 18 may be sent to a liquefaction unit, to storage or to user equipment (not shown).

Utilizing a system as shown in FIG. 1 for the production of nitrogen and argon from air, the temperature, Pressure and composition of streams at critical points in the system were determined and are expressed in Table III. In the system reported on in Table III, the first separator 12 is a PSA unit run on a 4-minute pressure-vacuum cycle with adsorption pressure of about 34 psig and desorption at 200 torr to yield a product stream containing about 3 percent of oxygen. The PSA unit 60 is operating on a pressure-vacuum cycle at a feed pressure of 28 psig and desorption pressure of 200 mbar.

The compositions given for the streams in Table III are expressed in terms of oxygen, nitrogen and argon although certain streams contain other components such as carbon dioxide and water. Cryogenic distillation column 22 operates at a pressure of 44 psia.

In Table III: Point A is the superheated vapor product stream 14 from PSA unit 12; Point B is the saturated vapor reboil stream recycled to distillation column 22 through line 40; Point C is the saturated liquid oxygen product withdrawn from reboiler 38 through line 42; Point D is the saturated liquid, argon-rich side stream withdrawn from distillation column 22 through line 52; Point E is he saturated liquid stream withdrawn as crude argon product from PSA unit 60 through heat exchanger 54 via line 56; Point F is a super-heated oxygen-rich vapor stream from PSA unit 60 which is withdrawn through line 58 as a waste stream and recycled to the distillation column and Point G is the saturated vapor nitrogen product stream withdrawn from distillation column 22 through line 30.

TABLE III

| Point | Temp. (°F.) | Pressure (psia) | Percent Composition | |
|---|---|---|---|---|
| A | 85 | 47 | 95.5 | $N_2$ |
|   |   |   | 3.0 | $O_2$ |
|   |   |   | 1.5 | Ar |
| B | −275.4 | 45 | 98.6 | $O_2$ |
|   |   |   | 1.4 | Ar |
| C | −275.4 | 45 | 99.0 | $O_2$ |
|   |   |   | 1.0 | Ar |
| D | −279.9 | 44.6 | 0.96 | $N_2$ |
|   |   |   | 41.5 | $O_2$ |
|   |   |   | 57.54 | Ar |
| E | −283.1 | 41 | 1.35 | $N_2$ |
|   |   |   | 3.18 | $O_2$ |
|   |   |   | 95.47 | Ar |
| F | 85 | 45.1 | 0.71 | $N_2$ |
|   |   |   | 66.19 | $O_2$ |
|   |   |   | 33.1 | Ar |
| G | −301.2 | 44 | 100 | $N_2$ |

As is evident from the data in Table III, the subject process is advantageous in that nitrogen and argon are recovered in excellent yield and purity. The PSA unit 60 receiving the side stream feed from the cryogenic distillation column 22 will produce a product stream 56 containing 96 percent or more of the argon fed into the distillation column at a purity of 97 percent or higher. The present system is particularly advantageous in areas of application having a low oxygen demand.

Figure 2:
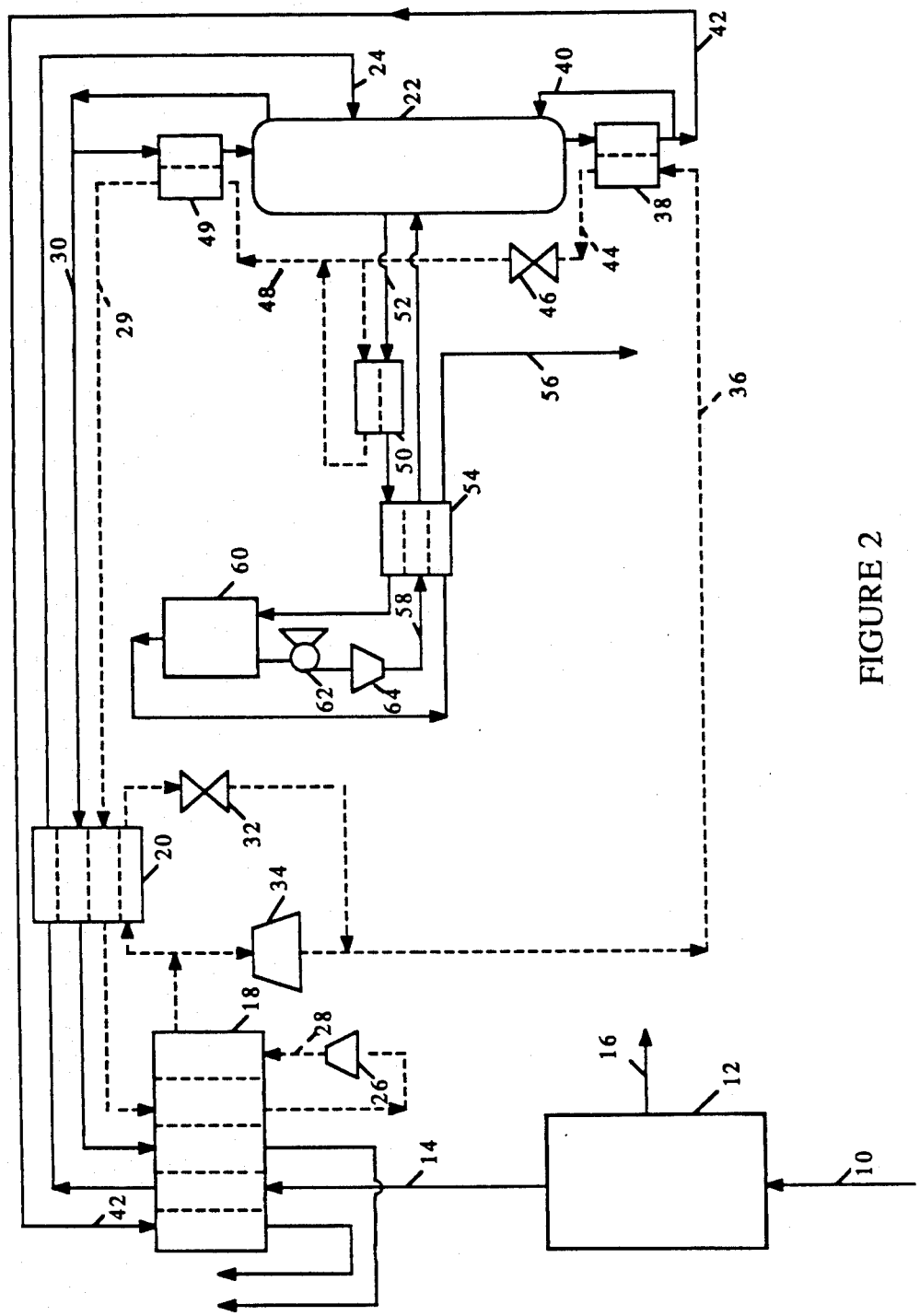
FIG. 2 is a schematic diagram of the process of the invention utilizing a fluid other than pure nitrogen as the heat pump fluid.

In FIG. 2, a system is illustrated using a heat-pump fluid other than pure nitrogen, e.g. an argon-nitrogen mixture or an oxygen-nitrogen mixture. In the system shown in FIG. 2, the heat-pump circuit is an external circuit since the fluid cannot be withdrawn from the product line 30 as in FIG. 1. The designations in FIG. 1 are repeated in FIG. 2 and have the same meaning.

In FIG. 2, the combined liquid-vapor heat-pump fluid in line 48 is not reintroduced into distillation column 22 as in FIG. 2. Rather, it is introduced into a condenser 49 at a pressure nearly equal to the pressure of the effluent from the second J-T valve 46. As indicated by the dotted line in FIG. 2, the cold effluent from condenser 49 is returned as stream 29 through heat exchangers 20 and 18 to recover refrigeration therefrom after which it is introduced into compressor 26 as in FIG. 1. In the system shown in FIG. 2, the overall column heat balance is calculated utilizing the pressures of streams 36 and 29. For distillation column 22 operating at a pressure of 45 psia, the pressures for streams 36 and 29 will typically be 145 psia and 35 psia, respectively.

The invention has been described with reference to preferred embodiments thereof. It will be appreciated by those skilled in the art that various modifications may be made from the specific details given without departing from the spirit and scope of the invention.

What is claimed:

1. A process for the coproduction of purified nitrogen and argon from a gaseous stream containing them in combination with at least oxygen comprising:

(a) introducing said stream under pressure into a noncryogenic separation means and recovering therefrom a gaseous stream enriched in nitrogen and argon;
   (b) introducing said enriched stream into a distillation column;
   (c) withdrawing a purified nitrogen product stream from the top of said column, an oxygen-rich stream from the bottom of said column and an argon-enriched side stream from an intermediate point in said column where there is a relatively high argon content;
   (d) introducing said side stream into a pressure swing adsorption unit to further enrich said stream in argon; and
   (e) withdrawing said further enriched argon stream as product.

2. A process in accordance with claim 1, wherein said gaseous stream is introduced into the noncryogenic separation means in step (a) at a pressure of from about 30 to 200 psig.

3. A process in accordance with claim 1, wherein said noncryogenic separation means is a pressure swing adsorption unit.

4. A process in accordance with claim 1, wherein said noncryogenic separation means is a gas diffusion zone.

5. A process in accordance with claim 1, wherein the enriched stream formed in step (a) contains from about 1 to 10 percent of oxygen.

6. A process in accordance with claim 1, wherein the enriched stream formed in step (a) is cooled by heat exchange against the nitrogen product stream and oxygen-rich stream prior to being introduced into said cryogenic distillation column.

7. A process in accordance with claim 1, wherein a portion of the nitrogen product stream withdrawn from said cryogenic distillation column is returned to said column as reflux.

8. A process in accordance with claim 1, wherein a portion of the oxygen-rich stream withdrawn from the bottom of said cryogenic distillation column is recycled to the column.

9. A process in accordance with claim 8, wherein the remainder of said oxygen-rich stream is taken as product.

10. A process in accordance with claim 1, wherein the refrigeration for said process is provided by a refrigeration cycle utilizing nitrogen withdrawn from the nitrogen product stream as the heat pump fluid therein.

11. A process in accordance with claim 1, wherein, in step (d), an oxygen-rich waste stream is formed in said pressure swing adsorption unit and said stream is returned to an intermediate point in said cryogenic distillation column wherein the composition of the gas mixture in the column is similar to that of said stream.

12. A process in accordance with claim 11, wherein said waste stream and said argon product are passed in heat exchange with said argon-enriched side stream prior to introduction thereof into said pressure swing adsorption unit.

* * * * *

UNITED STATES PATENT AND TRADEMARK OFFICE
CERTIFICATE OF CORRECTION

PATENT NO.    : 4,861,361

DATED         : August 29, 1989

INVENTOR(S)   : Ravi Jain, et al

It is certified that error appears in the above-identified patent and that said Letters Patent is hereby corrected as shown below:

Front page-Abstract- line 5, "encircled" should read --enriched--;

Column 3, line 43, "ill" should read --will--;

Column 6, line 63, "he" should read --the--;

Column 6, line 68, there should be a --22-- after the word "column"; and

Column 8, line 5, the word --cryogenic-- should precede the word "distillation".

Signed and Sealed this

Eighteenth Day of December, 1990

*Attest:*

HARRY F. MANBECK, JR.

*Attesting Officer*  *Commissioner of Patents and Trademarks*